(12) United States Patent
Sloan, Jr. et al.

(10) Patent No.: US 8,526,016 B2
(45) Date of Patent: Sep. 3, 2013

(54) SYSTEM AND METHOD FOR USER-SELECTABLE SOFT FONT AND PRINT STREAM DATA TEMPLATE CONTROL IN A PRINTER DRIVER

(75) Inventors: Richard A. Sloan, Jr., Southbury, CT (US); David G. Collings, Shelton, CT (US); John R. LePage, Woodbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 1321 days.

(21) Appl. No.: 12/275,958

(22) Filed: Nov. 21, 2008

(65) Prior Publication Data

US 2010/0128294 A1    May 27, 2010

(51) Int. Cl.
*G06K 15/02* (2006.01)

(52) U.S. Cl.
USPC ............................................. 358/1.11; 358/1.1

(58) Field of Classification Search
USPC ..................................... 358/1.1, 1.11, 1.15
See application file for complete search history.

(56) References Cited

U.S. PATENT DOCUMENTS 6,825,941 B1 * 11/2004 Nguyen et al. ............... 358/1.15
2012/0179470 A1 * 7/2012 Pierce et al. .................. 704/270

* cited by examiner

*Primary Examiner* — King Poon
*Assistant Examiner* — Iriana Cruz
(74) *Attorney, Agent, or Firm* — George M. Macdonald; Charles R. Malandra, Jr.; Steven J. Shapiro

(57) ABSTRACT

Printing systems and methods for user-selectable dynamic soft font and print stream data template control processing in a printer driver are provided. The system utilizes a print job driver screen that provides the user with a selectable option to convert soft fonts into graphics that are transferred to the printer. When using multi-byte fonts, and in particular when using multi-byte fonts in a character mangling operating system, printer memory may be rapidly allocated and consumed. However, soft fonts persist in printer memory for the length of the print job. The printer system provided herein allows the user to dynamically select an option to forgo soft font loading for the entire print job and instead transmit appropriate font graphics that are discarded from memory after use after a character threshold has been reached.

8 Claims, 5 Drawing Sheets

SYSTEM AND METHOD FOR USER-SELECTABLE SOFT FONT AND PRINT STREAM DATA TEMPLATE CONTROL IN A PRINTER DRIVER

FIELD OF THE INVENTION

The present invention relates to printing systems and more particularly to printing systems and methods for user-selectable dynamic soft font and print stream data template control processing in a printer driver.

BACKGROUND OF THE INVENTION

Many types of document printers have been developed including home and office impact, laser, led and ink-jet printers. Larger printers may be used for office workgroup applications or in industrial high speed printing applications. Similarly, many special purpose printers have been developed such as dedicated envelope addressing printers including the ADDRESSRIGHT line of addressing printers available from Pitney Bowes Inc. of Stamford, Conn.

Many physical data connections are used to communicate with printers including the common parallel port connections using CENTRONICS or IEEE 1284 standards, serial ports such as Universal Serial Bus (USB), ETHERNET network connections, wireless networking connection such as those using the IEEE 802.11 standards, FireWire using the IEEE 1394 standard and Infra Red wireless using the IrDA standard. Many printers process a single job at a time over the communications channel and other printers support local spooling of print jobs. Additionally, network servers may remotely spool print jobs being sent to a device connected to the network.

Many printers are configured to receive data from a host computer or printer spool in a printer control language format. An early format is the ASCII format used by early printers whereby ASCII character and control codes were sent to the printer for processing. Character fonts describe generally the shape of each individual character and often the size of each character. The ASCII code assigns a unique 7-bit number to each upper and lower case English alphabet character, but does not define the character font to be used. In such printing systems, the printer might have a dedicated internal font stored in hardware or firmware used for processing the ASCII stream. A more modern font code standard is the Unicode font code system including standards such as the UTF-8 standards that is said to maximize compatibility with the ASCII system. Additionally, more complicated printer control protocols and languages were also developed. One widely used printer control language is known as the "printer control language" (PCL) and has been revised through several released versions of the standard including PCL 5. Additionally, the POSTSCRIPT printing language is frequently used with printing systems. Modem printers often provide for the use of soft fonts to supplement a set of character fonts stored in printer hardware or firmware. Such soft fonts are downloaded to the printer from the host computer. However, raster file formats typically increase data transmission times between the host and the printer.

When using PCL environment, a host computer typically configures a data stream to include both print function commands and interspersed print data. The printer then typically converts the received data stream into a list of simple commands, called display commands, which define what must be printed. The printer then processes the display commands and renders the described objects into a raster bit map. Typically, only a small proportion of the printer's available memory is allocated to storage of the print function commands and interspersed data, with the majority of the print buffer area being given over to support of processing functions and the resultant raster bit map image. Accordingly, printers do not always advantageously apportion available memory. Additionally, multi-byte character fonts typically require more memory space than single byte character fonts. Moreover, the traditional protocols used for page printing may not always be suitable for use with specialized printing systems such as addressing systems. Certain printers including certain laser printers include a driver selectable feature such that True Type Fonts are printed as graphics, but all the fonts would then be printed as graphics. Certain printers process raster bitmap images directly sent by the host computer.

Accordingly, there are several disadvantages of currently available printing systems and methods in general and of printing systems for user-selectable dynamic soft font control and data format processing.

SUMMARY

The illustrative embodiments of the present application describe printing systems and more particularly describe printing systems and methods for user-selectable dynamic soft font and print stream data template control processing in a printer driver.

In one illustrative configuration, a printing system and method for user-selectable dynamic soft font control and data format processing is provided. The system utilizes a print job driver screen that provides the user with a selectable option to convert incoming characters using soft fonts into graphics that are transferred to the printer, but only after a pre-defined or user selectable threshold number of characters is reached. When using multi-byte fonts, and in particular when using multi-byte fonts in a character mangling operating system, printer memory may be rapidly allocated and consumed. However, soft fonts persist in printer memory for the length of the print job. The printer system described herein allows the user the option to forgo soft font loading for the entire print job and instead transmits appropriate graphics that are discarded from memory after use.

In another illustrative configuration, an alternative printing system and method for is provided. If the printer driver detects a character mangling operating system, the printer driver defaults to the print fonts as graphics mode after a relatively small number of characters in the job such as 1000 characters.

In yet another illustrative configuration, a printing system for user-selectable dynamic template command character processing is described. The printing system provides for at least one rarely used printable 7-bit ASCII character to function as an in-stream command character. Additionally, the printing system allows the user to dynamically select whether the template command character function should be enabled for a particular print job.

Several additional alternative configurations are also described below.

BRIEF DESCRIPTION OF THE DRAWINGS

The accompanying drawings illustrate several embodiments of the application, and together with the general description given above and the detailed description given below, serve to explain certain principles of the invention. As shown throughout the drawings, like reference numerals designate like or corresponding parts.

DETAILED DESCRIPTION

The illustrative embodiments of the present application describe printing systems and more particularly describe printing systems and methods for user-selectable dynamic soft font control and data format processing. Printer drivers typically process soft fonts by loading them into the printer memory for the duration of a print job. However, addressing printers may process print jobs that include many thousands of envelopes. In print jobs comprising thousands of envelopes and consequently thousands of addresses, character mangling operating systems may convert print data to definable soft fonts/characters and therefore require too much printer memory for soft font storage. However, switching to printing fonts as graphics for all print jobs may unnecessarily slow average print processing times.

Figure 1:
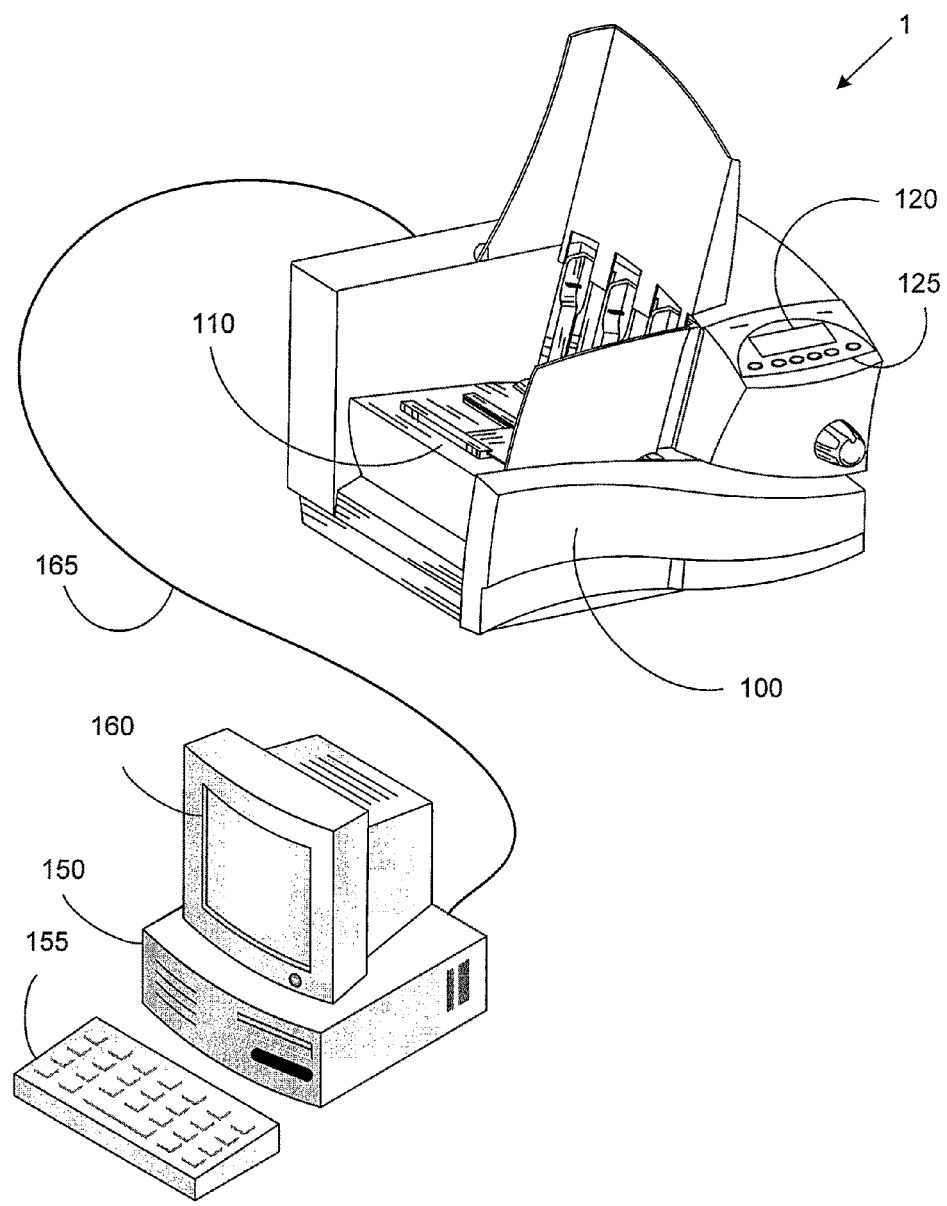
FIG. 1 is a schematic diagram of a printing system for user-selectable dynamic soft font control and data format processing including an addressing printer and co-located computer according to an embodiment of the present application.

Referring to FIG. 1, a schematic diagram of a printing system 1 for user-selectable dynamic soft font control and data format processing including an addressing printer and co-located computer according to an embodiment of the present application is shown. In this illustrative example, printer 100 comprises a modified version of the DA75S ADDRESSRIGHT SERIES addressing printer available from Pitney Bowes Inc. of Stamford Conn. The printer 100 is a shuttle head ink-jet addressing printer, but other printers including adjustable fixed head ADDRESSRIGHT printers such as the DA95F may be used. Printer 100 includes a feed path 110 for feeding the media to be addressed and a user interface including a display 120 and keypad 125. Other general purpose and industry specific printer may alternatively be utilized such as product packaging printers.

The collocated computer 150 comprises a DELL PRECISION M6300 computer running the Korean language version of the WINDOWS XP operating system with Korean language multi-byte fonts and includes a display 160 and a keyboard 155. The computer 150 is optionally connected to a network such as the Internet. The co-located computer 150 is operatively connected to communications channel 165 that is preferably a wired ETHERNET or USB connection, but that in other systems may include a IEEE 1284 bi-directional parallel printer communications channel (printer cable). The printer cable 165 is operatively connected to printer 100. Alternatively, the computer 150 is running the English version of the WINDOWS XP operating SYSTEM using single byte and multi-byte language fonts.

Figure 2:
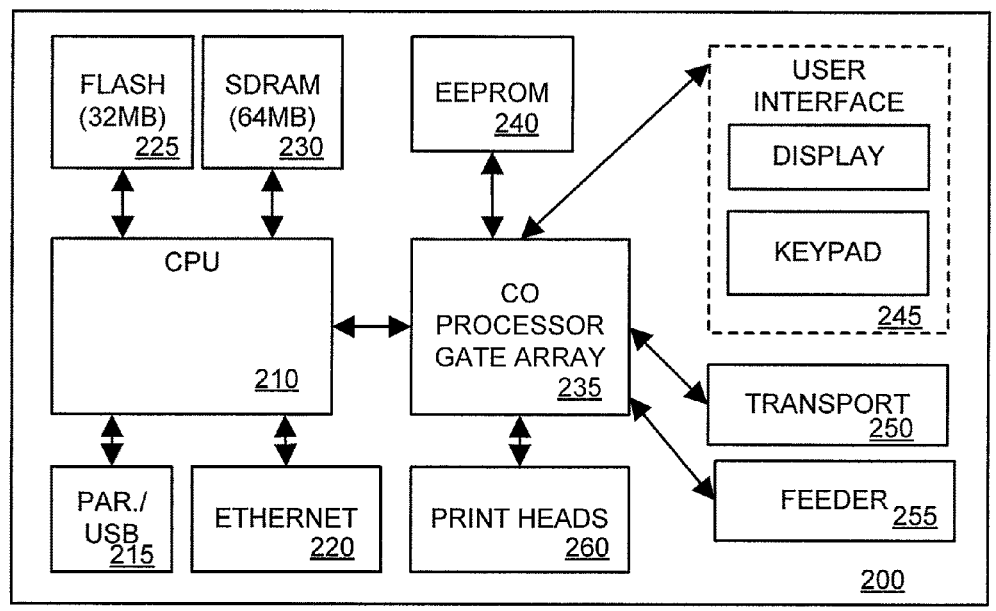
FIG. 2 is a schematic diagram of the control system of the addressing printer of FIG. 1.

Referring to FIG. 2, a schematic diagram of the control system 200 of the addressing printer 100 of FIG. 1 is shown. The addressing printer includes a CPU 210 that is preferably a SH4 processor. The control system 200 includes communication subsystems including USB ports 215 (parallel ports in older models) and an ETHERNET network port 220. The CPU is operatively connected to FLASH memory 225 and SDRAM static RAM memory 230. CPU 210 is also connected to a specialized co-processor such as gate array 235. Alternative systems such as an ASIC device may be used. The co-processor is operatively connected to a memory device (EEPROM) 240, a user interface 245, a media transport subsystem 250, a feeder subsystem 255 and the print heads 260.

As many applications in the printing industry have migrated to larger print jobs, including advanced graphics, and utilizing frequent font changes and character size changes, the need for additional memory in printers servicing WINDOWS based applications has grown dramatically. This is especially true when languages such as multi-byte Japanese, Korean, and Chinese fonts including complex font characters are involved. The systems and methods described here provide for use of such complex fonts with large print jobs and avoid the need for massive memory upgrades within addressing printers. The printers and methods herein implement the dynamically user-selectable ability to convert text (fonts) into graphics which are then transmitted to the printer and printed as graphics instead of downloading soft fonts that remain resident in printer memory for the entire print job. Moreover, the system provides a threshold number of characters in the print job before the time consuming switch to fonts as graphics is performed.

While this dynamically user-selected graphic font mode takes more time for data transmission for the particular print job after the threshold has been reached, the font graphics are discarded from printer memory as soon as they are used. Accordingly, printer memory is conserved and the printer systems described herein are able to successfully process a wider range of memory intensive print jobs. The traditional printers might encounter memory error conditions for similar print jobs due to the lack of the described feature. Accordingly, print jobs that encounter out of memory error conditions when standard soft fonts are used can advantageously apply the methods described herein to process such jobs without additional memory required in the printer. The system described herein provides several advantages using a dynamically user-selected soft font control mechanism. Initially, the font as graphic mode need only be selected when a specific job evidences a related soft font problem or belongs to a class of jobs known to experience such problems. Additionally, the font as graphic mode has the effect of transferring the font rendering work back to the PC into a non-real-time area with significantly greater memory resources than in the addressing printers. The user may invoke the method on a job-by job basis as needed. Accordingly, the printer driver pre-processes the fonts after the character threshold to switch to sending down graphics in the PCL stream.

When using a Korean language font, many symbols are constructed from overlaying multiple subset characters. The modified DA75S printer described herein has been modified to handle this situation gracefully. The driver is thus programmed with a greater understanding and ability to deal with the overlapping character situation than the printer firmware. By downloading such fonts as a graphic, the firmware is only being required to print a defined graphic, and is not required construct a complex character from font commands. Accordingly, this method simplifies the task that the firmware has to accomplish for such complex overlapping character fonts and also reduces the overall memory requirement because the firmware does not need to maintain the fonts in memory. This method may be selected for cases in which the printer has declared an out of memory error or where characters are being printed incorrectly when using multiple byte fonts.

Figure 3:
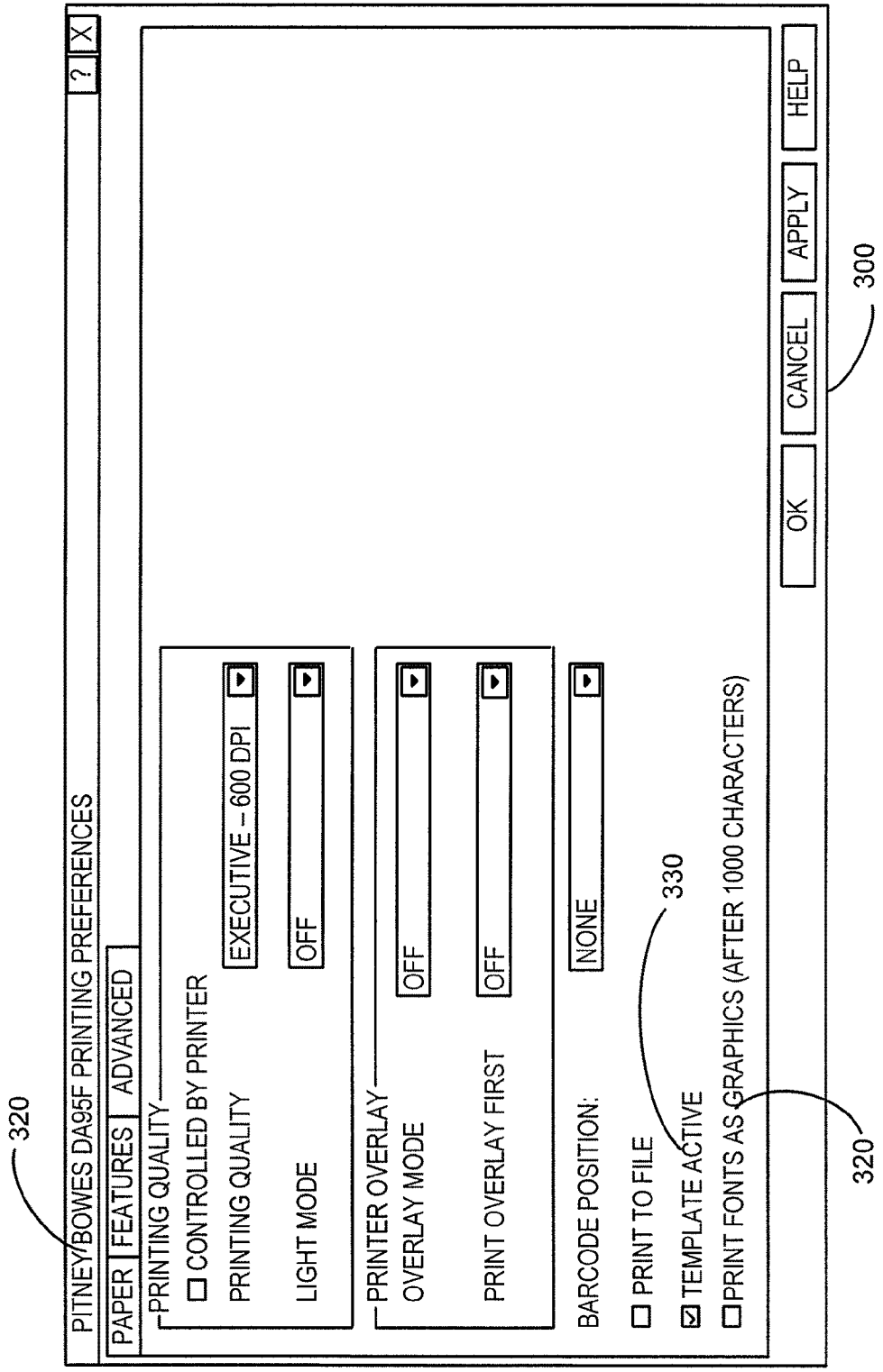
FIG. 3 is a perspective view of an addressing printer driver preferences dialog window executing on the co-located computer of FIG. 1.

Referring to FIG. 3, a perspective view of an addressing printer driver preferences dialog window 300 executing on the co-located computer of FIG. 1 is shown. The dialog window 300 is a screen shot of the driver preferences window running on computer 150 for printer 100. The features tab 310 provides several user-selectable options for a particular print job. Feature 320 allows a user to dynamically select a "print fonts as graphic" mode for a particular print job as described herein. This feature is shown here with a static threshold of 1000 characters. Accordingly, when the particular print job reaches 1000 characters, the system switches from a soft font mode to a font as graphics mode. In an alternative applicable to any of the embodiments herein, feature 320 may also include a user selectable threshold such as by using a text entry box, a slider or other user interface control. Feature 330 allows a user to dynamically select a command template feature for a particular print job as described herein. The command template feature utilizes a rarely used printable graphic that is "in-line" in the print stream character data as an alternative command character as opposed to the escape code used in PCL.

In an alternative applicable to any embodiment herein, the character threshold may be selectable by document boundaries, such as switching modes at the next envelope to be printed by an address printer after 1000 characters or 20,000 characters. In yet another alternative applicable to any embodiment herein, the threshold may instead include a page threshold or document threshold so that for example, each envelope printed would be a document and the threshold may be set at 50 documents.

Figure 4:
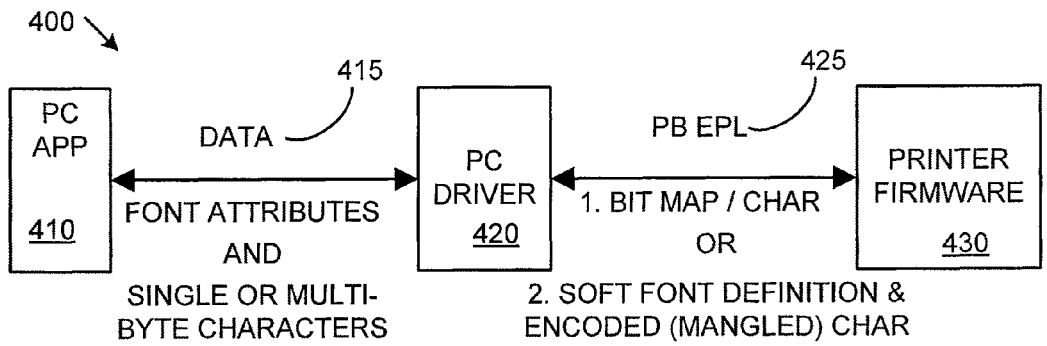
FIG. 4 is a schematic diagram of typical data flows in the printing system of FIG. 1.

Referring to FIG. 4, a schematic diagram 400 of typical data flows in the printing system of FIG. 1 is shown. Here, PC APP 410 is running on computer 150 and is configured to communicate with a PC Driver 420 that is installed into the operating system of computer 150. The PC Driver is specifically provided for use with printer 100. The PC App 410 is used to print data such as in the illustrative example described herein, a job consisting of thousands of addresses to be printed on media such as envelopes using addressing printer 100. The data 415 typically includes font attributes and single or multiyear characters as the case may be.

The driver 420 is compatible with the modified PITNEY BOWES ENVELOPE PRINTER LANGUAGE (PB EPL). The PB EPL protocol is provided for use with the ADDRESS-RIGHT series of addressing systems. PB EPL is a PCL 5 like page definition language specialized for driving the Pitney Bowes envelope printers supporting a subset of PCL 5 commands and certain extensions such dynamically selectable soft font processing and dynamically selectable in-line command character template processing. If the print fonts as graphic mode is active, the PB EPL data stream 425 presented to the printer 100 will include option 1, bit map character data. If the print fonts as graphic mode is not active, soft fonts are downloaded such as by normal soft font. In option 1, the printer driver 420 renders the font data to provide the appropriate bit map to the printer 100.

With reference to FIG. 2 and FIG. 4, the printer memory map utilization for the modified DA75S or DA95F varies for different character printing methods. The dynamic memory made available to the printer application firmware by the WINDOWS CE operating system after is has reserved the DRAM it needs and memory has been allocated for print head data buffers may be approximately 22.5 Mb that is partitioned into 4 heap areas. The heap areas in an illustrative configuration include a parser heap that includes temporary storage used when parsing incoming PCL commands and data (0.5 Mb), a font heap used for temporary storage used for storage of downloaded (soft) fonts (2 Mb), a page heap for temporary storage or recoverable page print objects (such as addresses) (4 Mb) and a graphic heap used for temporary storage used for bitmap graphics (16 Mb).

When the printer is processing pure ASCII characters, they are rendered (rasterized) into character bitmaps by the printer firmware and an assigned font. When pure ASCII characters (codes 0-127) are sent to the printer only parser heap and page heap memory is used. The parser heap memory is returned after each address is parsed. The page heap is a circular buffer that is reused as needed. When soft font characters are rendered (rasterized) into character bitmaps by the PC driver and the sent as soft font definitions and soft font characters to the printer, the parser heap, the font heap and the page heaps are used. The parser and page heaps are freed up in the same manner as for pure ASCII. The allocated font heap memory is not freed up until after the end of the print job (the next PCL "Reset" command "<ESC>E"). However, a large print job with multi-byte character mappings onto soft fonts may exhaust the font heap and cause a memory out condition. The embodiments herein provide a user-selectable dynamic setting for using soft fonts up to a threshold in order to achieve good average printing speed but yet enable large jobs using multi-byte characters fonts.

When the printer is printing bitmap data (graphic) such as characters that are rendered (rasterized) into character bitmaps by the PC application or PC driver and the sent as graphic bitmaps rather than soft fonts to the printer, the parser heap, the graphic heap and the page heaps are used. The parser and page heaps are freed up in the same manner as for pure ASCII. It is important to note that the allocated graphic heap memory is freed up after each address is printed, so that there is no risk of a memory out condition.

Figure 5:
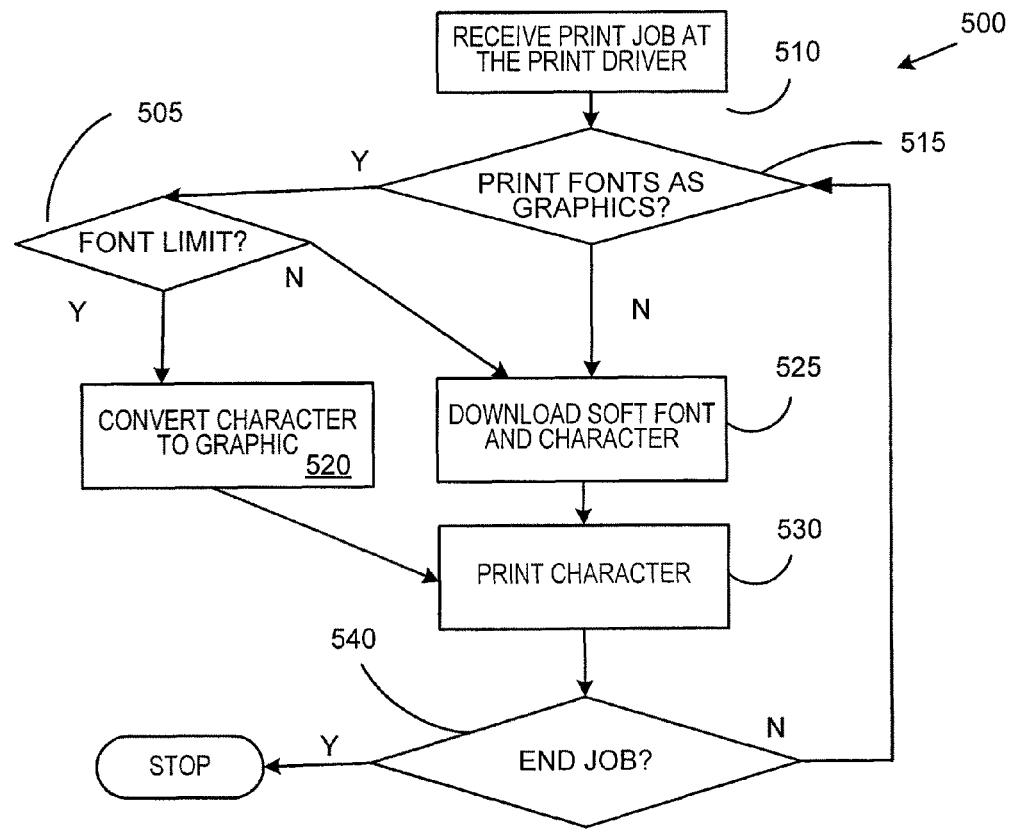
FIG. 5 is a flowchart showing an illustrative process for processing printer data according to a user-selectable dynamic soft font control selection according to an embodiment of the present application.

Referring to FIG. 5, a flowchart showing an illustrative process for processing printer data according to a user-selectable dynamic soft font control selection according to an embodiment of the present application is shown. In step 510, the printer driver receives the print job. In step 515, the print driver determines if the print fonts as graphics mode is active such as if selected by the user in the printer driver job preferences window. If so, the process proceeds to determine if the print character threshold is met in step 505. If so, the print driver renders each character using the font attributes and character data in step 520. If the character threshold is not met or if the print fonts as graphics mode is not active, the process proceeds to step 525 and the print driver sends the soft font definitions and character data to the printer. In step 530, the printer prints the characters and then determines in step 540 if the job is complete.

Figure 6:
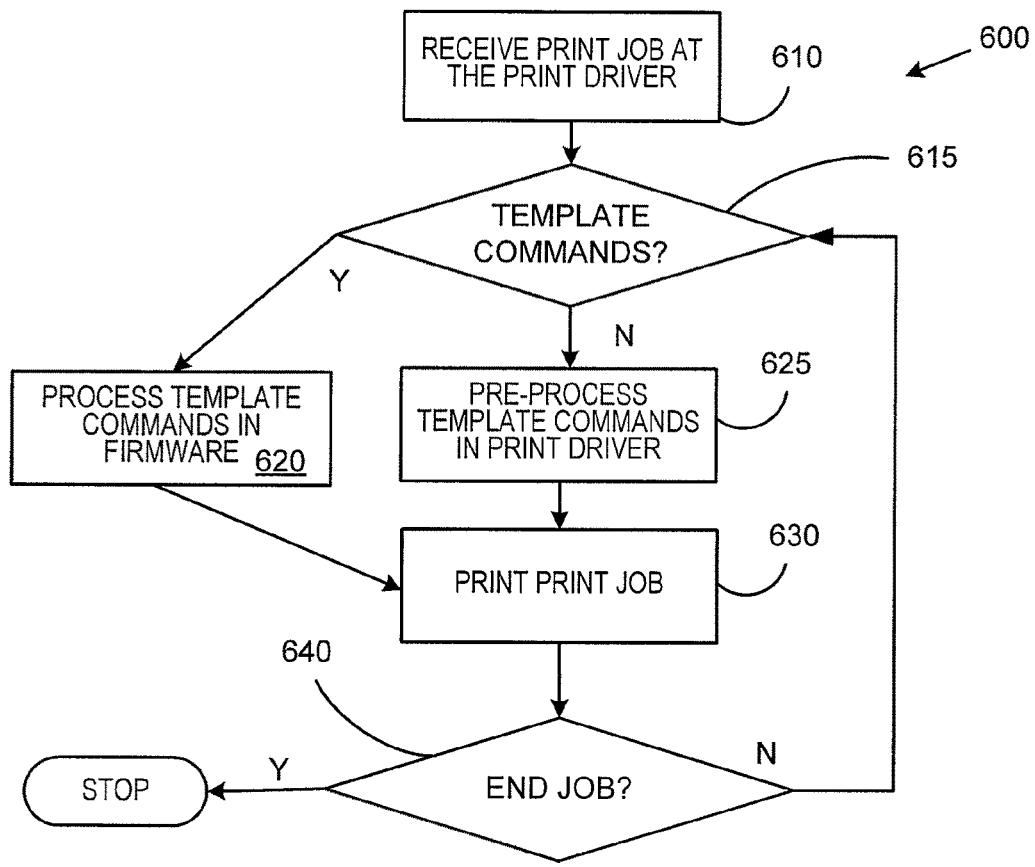
FIG. 6 is a flowchart showing an illustrative process for template command character processing according to a user-selectable dynamic command character control selection according to an embodiment of the present application.

Referring to FIG. 6, a flowchart showing an illustrative process 600 for template command character processing according to a user-selectable dynamic command character control selection according to an embodiment of the present application is shown. In step 610, the print job is received at the print driver. In step 615 the process determines if print templates are enabled. If so, the template commands are passed through to the printer firmware inline with the character data stream in step 620. If not, the print driver will pre-process the template commends in step 625. In an example, an inline barcode previously sent as a tilde command and ASCII decimal representation of the barcode would be converted to a barcode graphic in the print driver and then sent to the printer firmware. In step 630, the system determines if the print job is completed. If so, the print processing stops, and if not, the process control returns to step 615.

The Pitney Bowes ADDRESSRIGHT printers support the PB EPL printer control language as a subset of PCL 5 with extensions. Some of the extensions provide for templates such as barcode generation from inline text string commands. If a user wishes to print a barcode using any font, the system can use an in-line command character to signal to the printer that a particular format of barcode is being transmitted. Accordingly, user can provide in-line barcode functionality in all fonts without redefining each font to incorporate barcode formatting.

In-line templates support a variety of functions that can be automatically tuned during printing by setting up templates in the data. In addressing applications, these are usually related to Postal barcodes, but in other applications such as packaging, the templates also provide customized date and counter functions necessary for such applications to provide print time response to requirements. The modified PB EPL data stream described herein provides the ability to turn in-line command functionality on or off as a dynamic user-selectable option in the print driver job preference window.

When using multi-byte character sets, particularly for mangled character operating systems, the template method of using an special (and highly unused) printable character (~) as an in-line command character for triggering a template activity becomes problematic because that character can occur as part of character code for a soft font character such as when using a multi-byte character font.

In an alternative applicable to any of the embodiments herein, the printer driver 420 detects a multi-byte character mangling operating system and then deactivates the template setting. The power on default for printer 100 is to have the template active selection enabled so that "tilde" or other in-line command functions may be utilized. Similarly, printer 100 provides for normal soft font processing as a power on default.

Any or all of the computers described herein may include a personal computer, workstation, or mainframe and for servers may be resident in a single server or may be geographically distributed. The processes described herein may be implemented in C++ on a MICROSOFT WINDOWS XP platform.

While several embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for printing a document having a plurality of characters using a printer configured for soft font and graphic processing comprising:
 determining if a user-selectable soft-font character function having an associated character threshold is enabled;
 if the user-selectable soft-font character threshold is not enabled, then printing the document using the soft font processing;
 if the user-selectable soft-font character threshold is enabled, then determining for a current character whether the character threshold has been reached;
  if the character threshold has not been reached, then processing the current character using a soft font; and
  if the character threshold has been reached, then processing the current character using a font as graphic mode.

2. The method of claim 1, wherein:
the document is an envelope and the printer is an address printer.

3. The method of claim 1, wherein:
determining whether the user-selectable soft-font character function is enabled uses a printer driver executing on a collocated computer.

4. The method of claim 1, wherein:
determining the threshold uses a printer driver executing on a collocated computer.

5. The method of claim 1, wherein:
determining whether the threshold has been reached uses a printer driver executing on a collocated computer.

6. The method of claim 1, wherein:
determining whether the user-selectable soft-font character function is enabled comprises determining whether a multi-byte font is in use.

7. The method of claim 1, wherein:
determining whether the user-selectable soft-font character function is enabled comprises determining whether a threshold number of documents has been printed.

8. The method of claim 4, wherein:
the printer driver uses an interactive number entry user interface to determine the threshold input by a user.

* * * * *